United States Patent [19]

Smith et al.

[11] 4,454,084
[45] Jun. 12, 1984

[54] EXTRUSION DIE CONTROL SYSTEM

[75] Inventors: David J. Smith, Belle Mead; R. Ted Scharenberg, Whitehouse Station; William W. Beck, Piscataway, all of N.J.

[73] Assignee: Leesona Corporation, Warwick, R.I.

[21] Appl. No.: 386,735

[22] Filed: Jun. 9, 1982

[51] Int. Cl.³ ............................................. B29F 3/08
[52] U.S. Cl. .................................. 264/40.1; 264/40.5; 264/40.6; 264/564; 425/141; 425/144; 425/379 R
[58] Field of Search ................... 264/40.6, 40.1, 40.5, 264/564; 425/140, 162, 141, 143, 381, 144, 379 R, 461, 466

[56] References Cited

U.S. PATENT DOCUMENTS

| | | | |
|---|---|---|---|
| 2,938,231 | 5/1960 | Lowey, Jr. | 425/466 |
| 3,122,784 | 3/1964 | Jolliffe | 425/141 |
| 3,261,893 | 7/1966 | George et al. | 425/141 |
| 3,307,215 | 3/1967 | Gerhard et al. | 425/162 |
| 3,341,388 | 9/1967 | Bunyea | 425/143 |
| 3,649,726 | 3/1972 | Knowles | 264/40.6 |
| 3,751,537 | 8/1973 | Scotto et al. | 425/144 |
| 3,819,775 | 6/1974 | Mules | 425/144 |
| 3,883,279 | 5/1975 | Heyer | 264/40.6 |
| 3,920,365 | 11/1975 | Mules | 425/144 |
| 3,940,221 | 2/1976 | Nissel | 425/143 |
| 4,252,519 | 2/1981 | Farmer et al. | 425/143 |
| 4,272,466 | 6/1981 | Harris | 425/144 |
| 4,281,980 | 8/1981 | Hoagland et al. | 425/144 |
| 4,339,403 | 7/1982 | Upmeier et al. | 425/144 |

FOREIGN PATENT DOCUMENTS 3107701 1/1982 Fed. Rep. of Germany ...... 425/143
2070290A 9/1981 United Kingdom .............. 264/40.6

Primary Examiner—Jeffery R. Thurlow
Attorney, Agent, or Firm—Weingram & Klauber

[57] ABSTRACT

The thickness of plastic film extruded from a die is maintained at a desired uniform dimension by utilizing the thermal expansion and contraction of die adjusting bolts to control the width of the orifice of the die. A thickness gauge measures the film thickness across its transverse dimension and provides a signal to a microcomputer which uses the information to calculate the desired die bolt movements. The movements are converted to bolt temperature changes to change the set temperature of each die bolt. A temperature sensing element in the die bolt provides a temperature signal to the microcomputer which controls the amount of power output to each bolt to attain the new set temperature. The temperature sensing and control system provides greater sensitivity, accuracy, and faster response to changing conditions than systems relying only on measurement of thickness variations to control power output to the bolt heaters without using bolt temperature for feedback.

12 Claims, 5 Drawing Figures

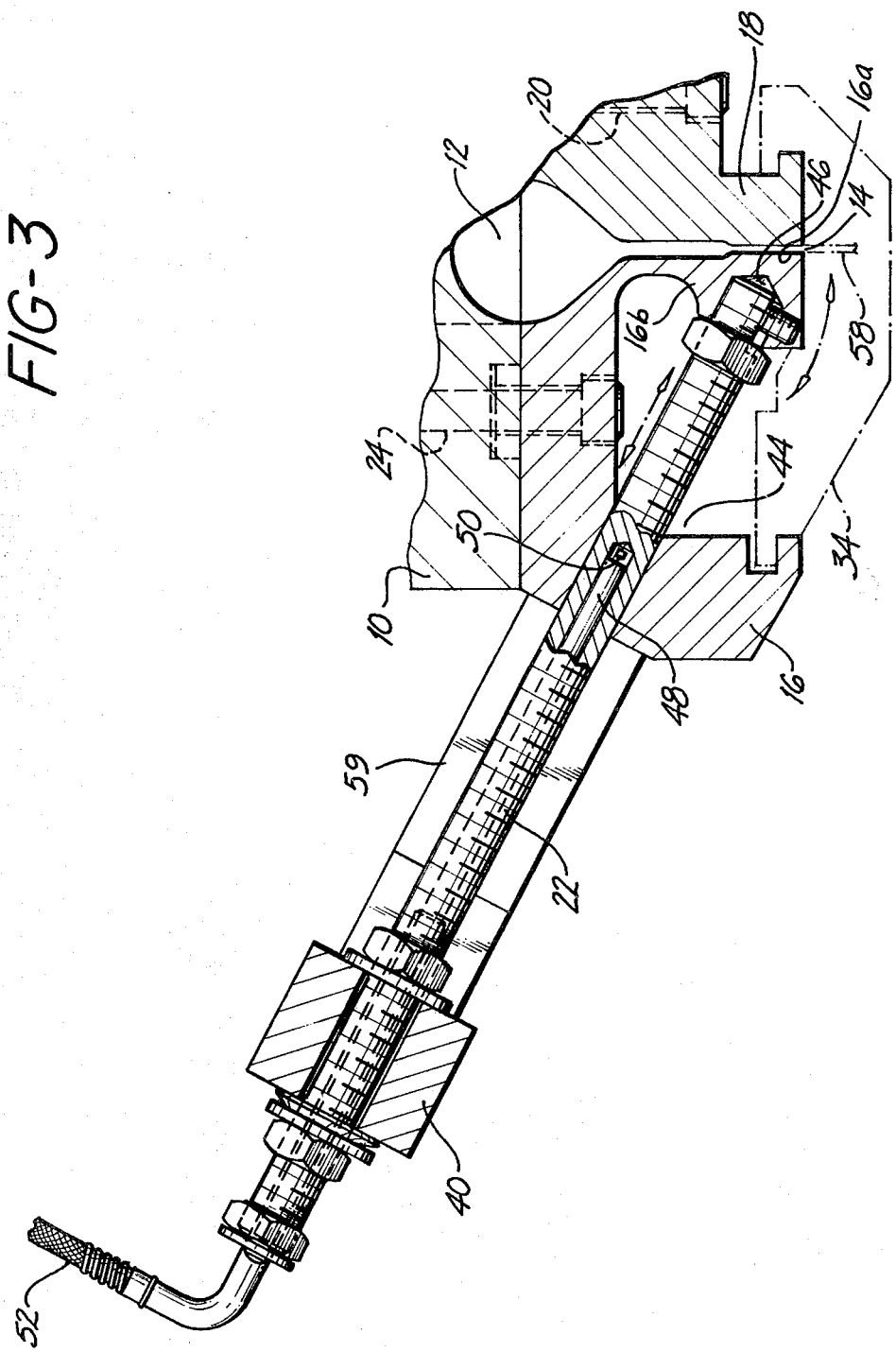

EXTRUSION DIE CONTROL SYSTEM

BACKGROUND OF THE INVENTION

1. Field of Invention

The present invention relates to systems for controlling the thickness of plastic film extruded from a die and particularly to an improved system which controls the heating of die adjusting bolts with greater speed and precision.

2. Description of the Prior Art

Devices for controlling the thickness of plastic film extruded from dies have generally employed adjustable die bolts which control the width of the orifice of the die. Mechanical means for adjusting the die bolts are shown in U.S. Pat. No. 3,293,689, assigned to the same assignee as the instant application, while electrical means for utilzing the thermal expansion and contraction of the adjustable bolts are described in U.S. Pat. No. 2,938,231. Heating of the bolt is done by an electrical heater on each bolt and is controlled manually or automatically by a gauging device. Increasing the electrical current raises the temperature of the bolt causing it to lengthen and reduce the width of the die opening, while decreasing the current allows the bolt to cool and contract to increase the opening.

With the introduction of automatic gauging devices, it became advantageous to utilize the signals from the gauge to automatically adjust the die orifice to maintain uniform firm thickness. One system for accomplishing this is found in U.S. Pat. No. 3,122,784 wherein signals from a gauging device actuate adjuster motors on each of the die adjuster bolts. This approach, however, was cumbersome and costly since it required a great many closely spaced high torque motors.

Another automatic adjustment system is disclosed in U.S. Pat. No. 3,940,221 which utilizes electrical means to control the voltage and current to the die adjusting bolt heaters and cooling means to cool the bolts and decrease the reaction time. Changes in film thickness are sensed automatically and current and voltage to the heaters increased or decreased as required until the film thickness returns to the set thickness. The length of the die adjusting bolt is thus determined by the amount of heat in the form of current supplied to it. The latter patent also shows the system employed for producing tubular extrusions as well as flat sheet and web forms.

A further system for controlling temperature of plastic extruders in shown in U.S. Pat. No. 4,272,466 in which a sensed temperature is compared with a manually preset temperature. However, this is not used for control of film thickness or the length of die adjusting bolts.

These prior art systems have disadvantages in that the reaction time for changing the length of the die adjusting bolt is unacceptably long for commercial operation. The time for cooling and reducing the bolt length is particularly long and where a continuous source of external cooling fluid is provided, this is expensive and inefficient since heating and cooling means are used at the same time. In addition, changes in external conditions such as ambient temperature, drafts, and line voltage variations influence the temperature of the die adjusting bolts.

SUMMARY OF THE INVENTION

It is therefore a primary object of the present invention to provide an improved, more efficient system for controlling thermal expansion and contraction of die adjusting bolts to obtain uniform film thickness.

It is another object of the present invention to reduce the response time for changing the die orifice width.

It is a further object of the invention to provide an improved system with greater sensitivity, precision, and stability.

An additional object of the present invention is to provide a system for controlling the thickness of plastic film extruded from a die which is less subject to changes in external conditions such as ambient temperature, drafts, and line voltage variations.

These objects are achieved by providing each adjustable die bolt with both an electric heater and a temperature sensor. A scanning thickness gauge measures the film thickness and provides a signal to a profile measurement device connected to a microcomputer. The microcomputer uses the information to calculate the desired die bolt movements by solving a series of simultaneous equations to eliminate bolt interactions. The desired movements are converted to bolt temperature changes to change the set point temperature of each die bolt concerned. The temperature sensor in the die bolt provides a temperature signal to the microcomputer where it is compared with the set point temperature. Any difference is corrected by increasing or decreasing the power output current to the die bolt heater to bring the die bolt to the desired set point temperature.

In the preferred embodiment, the microcomputer adjusts the power output by controlling the percentage of time the heater is turned on as compared to the time it is off. For example, in a typical operation, the microcomputer "reads" each bolt temperature every two seconds and turns the associated heater on for a certain percentage of each two second interval dependent on each bolt temperature reading.

Changes in die bolt temperature are corrected rapidly without waiting for the scanning gauge to sense a variation in film thickness from the change in the die bolt temperature. The die bolt heater and temperature sensor are mounted within the bolt for improved reaction time and external fins or threads on the die bolt provide increased heat transfer for rapid cooling. Tubular as well as flat sheet extrusions are maintained at a uniform thickness.

Other objects and advantages will become apparent from the following description of a preferred embodiment of the ininvention in conjunction with the accompanying drawings.

BRIEF DESCRIPTION OF THE DRAWINGS

FIG. 3 is an enlarged view of the thermal die adjusting bolt used to control the die orifice;

DESCRIPTION OF THE PREFERRED EMBODIMENTS

Figure 1:
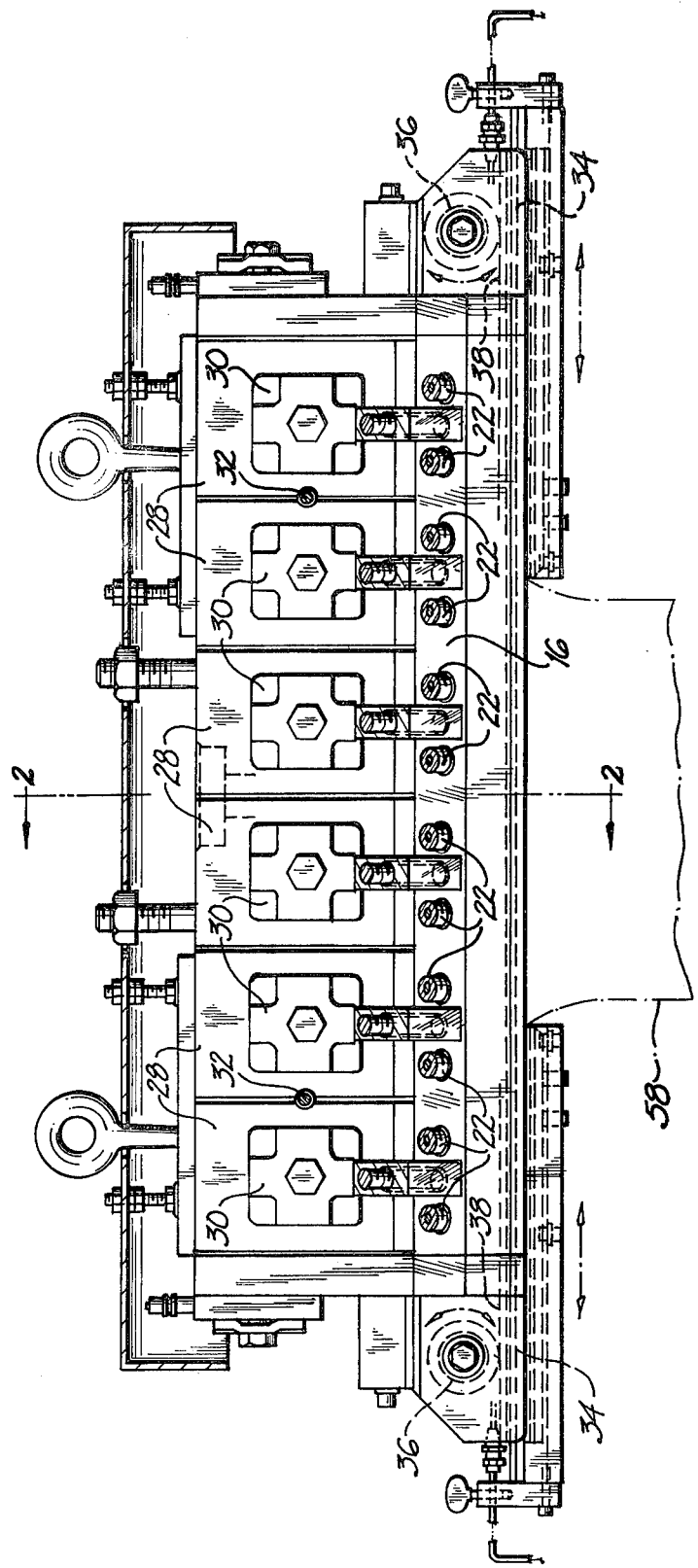
FIG. 1 is a side elevation view of the extrusion die incorporating the system of the present invention.
Figure 2:
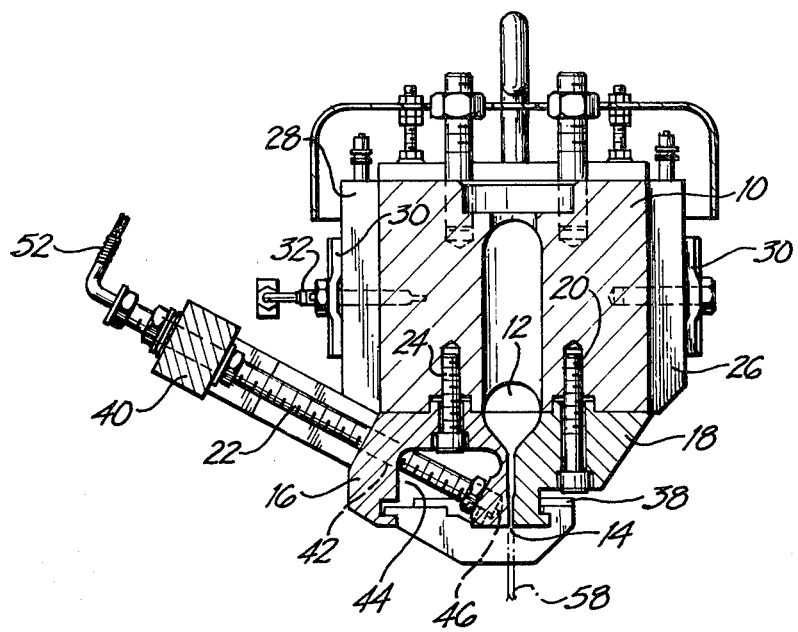
FIG. 2 is a partial section through the die taken along line 2—2 of FIG. 1.

As shown in FIGS. 1 and 2, the extrusion die includes a body 10 of generally rectangular shape having a length greater than that of the width of plastic film to be extruded. A manifold hole 12 extends along the body and leads to a narrow passage and external orifice or opening 14 which also extends along the full length of the body and is defined by die jaws 16, 18. Die jaw 18 is fixed in position on the body and is held by screws 20. Adjustable die jaw 16 is mounted on the die body 10 by means of screws 24 and has a necked down portion 16a.

Adjustment of the width of the orifice 14 is accomplished by bending the portion of the jaw 16b defining the orifice at necked down portion 16a. This bending, toward or away from the fixed jaw 18, is done by means of thermal die adjusting bolts 22 which will be discussed further. The distance between the jaws 16 and 18 at any point along the length of the die determines the thickness of the plastic film extruded at that point.

Affixed to the external sides of the die body are die heaters 26, 28 which are secured by heater clamps 30. Thermocouples 32 are secured to the body to measure the heat temperature in the die. Deckles 34 at opposite ends of the die body are adjustable by means of pinions 36 and gear teeth 38 or other suitable means which control longitudinal movement to adjust the length of the die opening and the resultant width of extruded plastic film.

As shown further in FIG. 2 and in more detail in FIG. 3, thermal die adjusting bolts 22 are mounted at intervals along the body and supported at each respective outer end by holder bar 40 to which the bolt is secured by nuts and washers. The holder bar 40 is mounted to the die jaw 16 by a series of posts 59 extending outwardly from the jaw.

A longitudinal section 42 of the bolt extends through a clearance hole in an extending outer portion of the adjustable jaw 16 separated by an open area 44 from a portion adjacent orifice or opening 14. The inner end of bolt 22 is received in a threaded hole 46 in the jaw portion 16b adjacent orifice 14. This end of the bolt is held within hole 46 by means of a set screw and nut.

Bolt 22 is preferably hollow and contains a cartridge heater 48 within the hollow interior. Also preferably located within the hollow is a thermocouple 50 for measuring the temperature within the bolt. The internal locations provide reduced reaction times. The bolt is threaded or finned externally to provide greater heat transfer and also reduce reaction time for cooling. Electrical connections for the heater and thermocouple are provided through the outer end 52. The inner portion of adjustable jaw 16 adjacent die opening 14 is movable with the axial expansion and contraction of the bolt 22 between the holder bar and the jaw portion 16b when the bolt is heated or permitted to cool.

Figure 4:
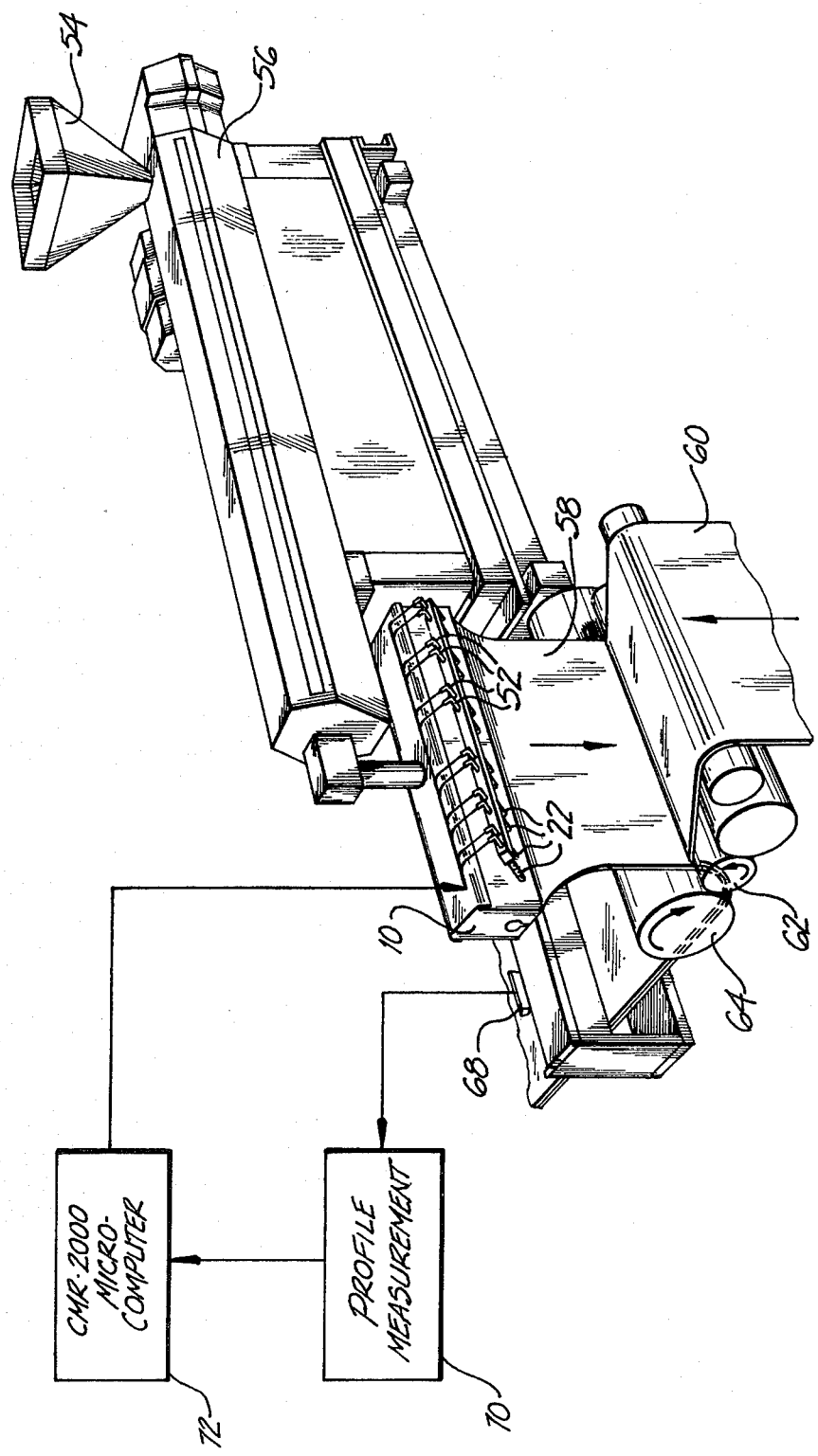
FIG. 4 is a pictorial view and schematic block diagram of the complete extruder die and automatic film thickness control system.

The extrusion coating machine and system for controlling the thickness of the plastic film are shown in FIG. 4. The plastic material is fed into a hopper 54, is heated and melted in extruder 56, and discharged into die 10. The material is extruded as a flat film 58 and bonded to a web 60 in the nip of a resilient roll 62 and a cooling roll 64. A plurality of thermal die adjusting bolts 22 are connected electrically to microcomputer 72. The film thickness is measured by a scanning thickness gauge 68 of a suitable well-known type such as betaray, X-ray, or optical radiation sources and receivers. Signals from the transverse scanning head of the gauge indicating the thickness of the film at successive points across the width of the film are supplied to the profile measurement device 70.

By use of appropriate conventional circuitry, the profile measurement device correlates the position of the transverse scanning head with the corresponding individual die adjusting bolts. If desired, the profile measurement device can also provide a visual read-out of the film thickness profile on, for example, a cathode ray tube or a printer. From the profile measurement device the signals are forwarded to the microcomputer 72, where they are converted to temperature set point signals for each adjusting bolt and stored and used as a reference.

The signal from the die bolt temperature sensor, thermocouple 50, is also sent to the microcomputer 72 where it is compared with the set point temperature from the thickness gauge and profile measurement device. Any difference signal is corrected by increasing or decreasing the power output to the die bolt heater. For example, if the thermocouple signal indicates a temperature below that of the set point signal, the percentage of on or operating time of the die bolt heater will be increased to further heat up the die bolt which then reaches the new set temperature. If the thermocouple indicates a higher temperature, the percentage of on or operating time of the die bolt heater will be decreased to permit cooling to the desired set point temperature. Thus, any change in the bolt temperature is immediately sensed and the power output adjusted to bring the bolt to the desired temperature.

An increase in temperature of the die bolt also causes expansion of the bolt which narrows the die opening and decreases thickness of the plastic film, while decreasing the temperature permits cooling and contraction of the bolt, causing the die opening and plastic film thickness to increase. The reaction time for controlling a thickness change by the expansion and contraction of the bolts after sensing a film thickness change, is much slower than that obtained by sensing the temperature changes of the adjusting bolts themselves. Assuming a constant set temperature, any change in die bolt temperature due to external causes, such as changes in ambient temperature, drafts, or variations in line voltage, is immediately corrected without waiting for variation in film thickness from the change in temperature to be sensed by the scanning thickness gauge.

Figure 5:
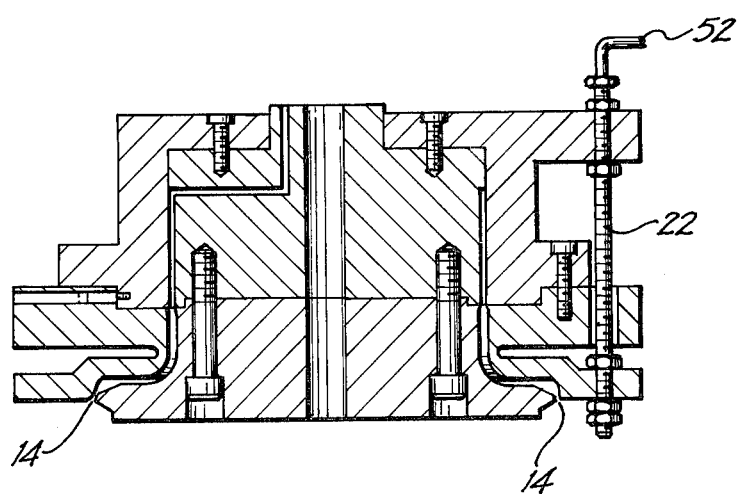
FIG. 5 is a sectional view of a tubular extrusion die employing a thermal die adjusting bolt.

FIG. 5 shows another variation of the thermal die bolt used in a tubular extrusion die. The same mechanism and control devices are used as in the flat sheet extrusion die, except that in this case, a plurality of thermal die bolts 22 are positioned around the circumference of the die. The annular orifice 14 is again controlled by the expansion and contraction of the bolts which widen or restrict the opening and adjust the thickness of the plastic tube. The power output to the bolt heater is likewise controlled by comparison of the temperature set point signal derived from the thickness gauge and the temperature sensed by the thermocouple in the adjustable die bolt.

The present invention thus provides an improved extrusion die control system having faster reaction time and greater accuracy and stability.

While only a limited number of embodiments have been illustrated and described, it is apparent that many other variations may be made in the particular design and configuration without departing from the scope of the invention as set forth in the appended claims.

What is claimed is:

1. Apparatus for controlling the thickness of plastic film from an extrusion die comprising:

a die body having opposing jaw surfaces forming an opening therebetween, one of said jaw surfaces being adjustable with respect to the other to control the width of said opening;

a plurality of thermal die adjusting bolts disposed along said one jaw surface, said bolts including electrical heating means for causing said bolts to expand and reduce the width of said opening upon application of increasing electrical power and to contract and widen said opening upon a reduction of said electrical power;

thickness measurement and scanning means for measuring the thickness of plastic film passing through said opening and at different transverse locations along said film, said measurement means providing a signal proportional to the thickness of said film;

temperature sensing means positioned at each said bolt for sensing the temperature of said bolts and providing a signal proportional to said bolt temperature;

means for converting said thickness measurement signal into a temperature reference signal;

means for comparing said temperature reference signal with said bolt temperature signal and providing a difference signal; and means for actuating said electrical heating means in accordance with said difference signal to control the temperature of said bolt and cause said bolt temperature signal to reach said reference signal whereby the thickness of said film is maintained at a predetermined uniform dimension.

2. The apparatus of claim 1 wherein said bolts are hollow and include an internal electrical heater.

3. The apparatus of claim 2 wherein said temperature sensing means is a thermocouple positioned within each said bolt.

4. The apparatus of claim 3 wherein said bolts are threaded or finned externally to provide cooling surfaces.

5. The apparatus of claim 3 wherein said die opening is longitudinal and said plastic film is a flat sheet.

6. The apparatus of claim 3 wherein said die opening is annular and said plastic film is tubular.

7. The apparatus of claim 3 including a microcomputer, said means for converting a thickness measurement into a temperature reference signal and said means for comparing said signals being included in said microcomputer.

8. The apparatus of claim 1 wherein said actuating means includes means to control the power output to said heating means in each bolt to control the temperature of said bolt.

9. The apparatus of claim 8 wherein said means to control the power output includes means to control the percentage of time power is supplied to said heating means in each of said bolts during predetermined time intervals.

10. A method for controlling the thickness of plastic film from an extrusion die having opposing jaw surfaces forming an opening therebetween, one jaw surface being adjustable to control the width of the opening, and a plurality of thermal die adjusting bolts including electrical heating means for adjusting the size of said bolts and said opening comprising the steps of:

measuring the thickness of plastic film passing through the die opening and providing a signal proportional to the thickness;

measuring the temperature of said bolts and providing a signal proportional to the bolt temperature;

converting the thickness measurement signal into a temperature reference signal;

comparing the temperature reference signal with the bolt temperature signal and providing a difference signal; and controlling the heating of said bolts in accordance with said difference signals to cause said bolt temperature signal to reach said reference signal and maintain the thickness of the plastic film at a predetermined uniform dimension.

11. The method of claim 10 wherein the heating of the bolts is controlled by controlling the power output to the heating means in each of the bolts to control the temperature of said bolt.

12. The method of claim 11 wherein the heating of the bolts is controlled by controlling the percentage of time power is supplied to said heating means in each of said bolts during predetermined time intervals.

* * * * *